Jan. 12, 1965 T. A. PRATER 3,165,652

ELECTRODE STRUCTURE FOR A MAGNETOHYDRODYNAMIC DEVICE

Filed July 16, 1962  2 Sheets-Sheet 1

Inventor:
Thomas A. Prater,
by Paul A. Frank
His Attorney.

Jan. 12, 1965  T. A. PRATER  3,165,652
ELECTRODE STRUCTURE FOR A MAGNETOHYDRODYNAMIC DEVICE
Filed July 16, 1962  2 Sheets-Sheet 2
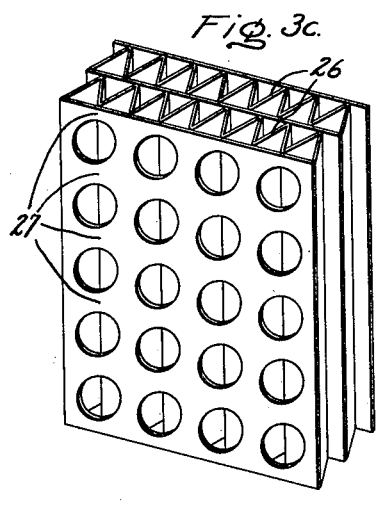
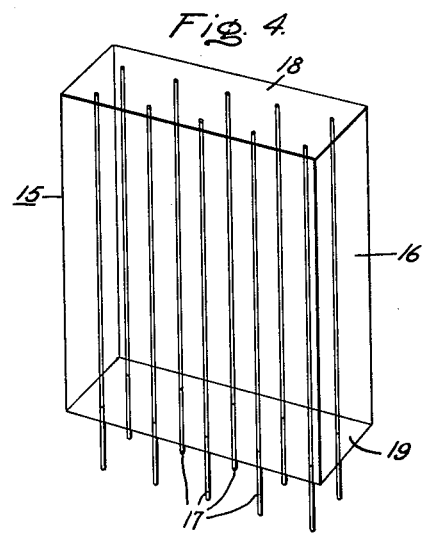
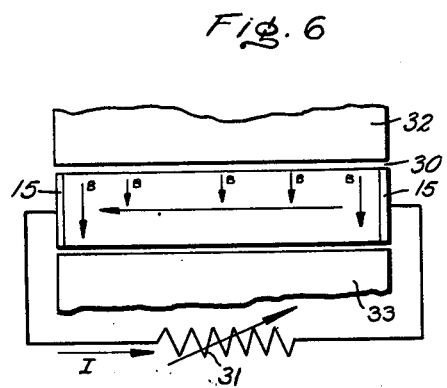
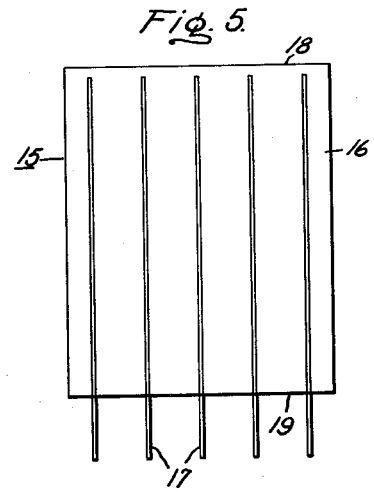
Inventor:
Thomas A. Prater,
by Paul A. Frank
His Attorney.

United States Patent Office 3,165,652
Patented Jan. 12, 1965

3,165,652
ELECTRODE STRUCTURE FOR A MAGNETO-
HYDRODYNAMIC DEVICE
Thomas A. Prater, Schenectady, N.Y., assignor to General
Electric Company, a corporation of New York
Filed July 16, 1962, Ser. No. 209,825
15 Claims. (Cl. 310—11)

This invention relates to apparatus for generating electrical power and, in particular, to improve electrode structure for apparatus which generates electrical power through the interaction of a moving conductive fluid and a magnetic field.

Electrical power may be produced by abstracting energy from a moving conductive fluid, preferably a gaseous one, as it passes through a magnetic field, thereby eliminating the rotating moving parts required for the production of electrical power in a conventional generating system; e.g., a steam turbine-generator. The body of scientific knowledge dealing with the interaction of a moving conductive fluid and a magnetic field is commonly known as magnetohydrodynamics, usually abbreviated to MHD. Typical systems for MHD power generation are described in detail in patent application Serial No. 114,434, entitled "Electrode Structure from Magnetohydrodynamic Device," in the name of Henry Hurwitz, Jr., and George W. Sutton, filed June 2, 1961, and assigned to the assignee of the present invention. The Hurwitz et al. invention contemplates rendering a gaseous fluid conductive by heating it to a temperature at which the gas becomes partially ionized. The ionized gas stream is driven through a magnetic field by a pressure differential causing an electromotive force to be generated in the gas. Under the influence of this electromotive force, such charged particles as are present in the gas are deflected to electrodes causing a unidirectional or direct current to flow through an external load circuit connected to the electrodes.

Conventional MHD generating systems are characterized by difficult maintenance problems because of the rugged environment to which the materials of the system components are exposed. The electrodes and the confining walls for the conductive gaseous fluid are exposed to temperatures of several thousand degrees Kelvin which are necessary to obtain the required ionization of the gas. A known method for substantially lowering the critical threshold temperature for ionization of the gaseous medium adds a small amount, in the range of 0.1–1% by volume, of some easily ionizable material to the gas, thereby reducing the ionization threshold temperatures from about 3500° K. to around 2000° K. While the seeding of the gaseous fluid eases the thermal stability requirements for the materials of the system components, it contributes to an already serious corrosion problem because the seeding agents are extremely corrosive at the operating temperatures. Erosion of the electrodes by the rapidly moving ionized gas stream is also a problem in attaining a practical MHD generator.

Practical MHD generators require electrode lifetimes at least in the order of months. Prior art MHD electrodes constructed of tungsten or molybdenum have been particularly susceptible to destruction by oxidation, often failing within seconds after operation in the MHD device. Graphite electrodes are similarly susceptible to oxidation or erosion failure. Sintered structures of powered refractory materials utilizing metal oxides to inhibit corrosive and erosive effects have exhibited electrical losses which render their use impractical. The electrode structure of the invention avoids the aforementioned prior art problems.

It is an object of the invention to provide an improved electrode structure for use in an MHD generator.

It is another object of the invention to provide a high temperature electrode structure which presents a low-impedance conductive path to the generated current and which effectively resists corrosion and erosion.

It is another object of the invention to provide an electrode with improved electrical characteristics which are not affected during use because of the resistance of the electrode materials to oxidation by the high temperature conductive fluid in the MHD generator.

It is a further object of the invention to provide an electrode structure for an MHD generator having improved electrical and mechanical characteristics.

Briefly stated, in accordance with the illustrated embodiments of the invention, the portions of the electrodes which come in contact with the moving conductive fluid during operation of the MHD generator comprise zirconia. The electrical conductivity of the zirconia may be improved by stabilization with either calcium oxide or praseodymium oxide. One embodiment of the invention utilizes a body of alumina having a layer of zirconia bonded to a surface thereof. Niobium conductors, embedded in the body of alumina, extend into the layer of zirconia so that the ends of the conductors are spaced beneath the surface of the zirconia layer. Increased mechanical strength may be attained by utilizing a conductive network in place of spaced individual conductors. Another embodiment of the invention utilizes a body of zirconia having a plurality of iridium conductors embedded therein. Each conductor has one end spaced below the surface of the electrode which is to contact the conductive fluid during operation of the MHD generator.

The subject matter of the invention is particularly pointed out and distinctly claimed in the concluding portion of the specification. The invention, however, both as to organization and method of operation may best be understood by reference to the following description taken in connection with the accompanying drawings, in which:

Figure 3A:
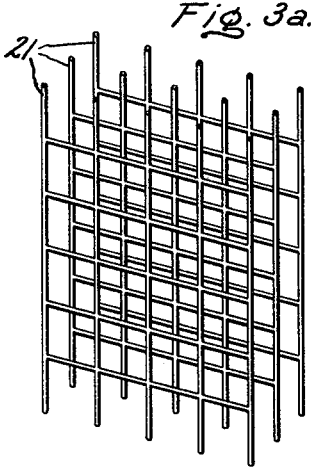
Figure 3B:
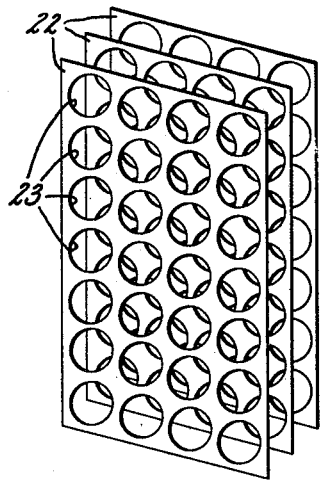

FIGURES 3(a), 3(b), and 3(c) are isometric views of conductive networks which may be utilized in the electrode of the invention;

FIGURE 4 is an isometric phantom view of a second embodiment of the electrode structure of the invention, FIGURE 5 is a front phantom view of the electrode of FIGURE 4, and FIGURE 6 is a diagrammatic cross sectional view of a typical direct current MHD generator.

Figure 1:
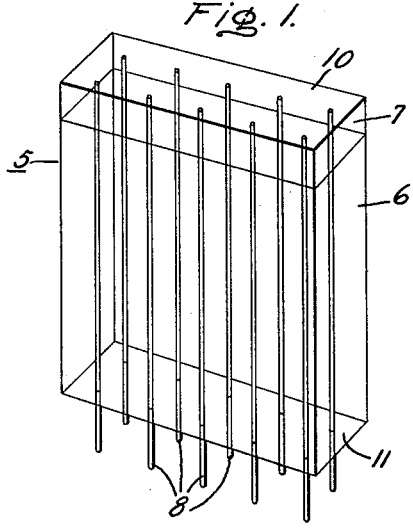
FIGURE 1 is a perspective phantom view of the embodiment of the electrode structure of the invention.
Figure 2:
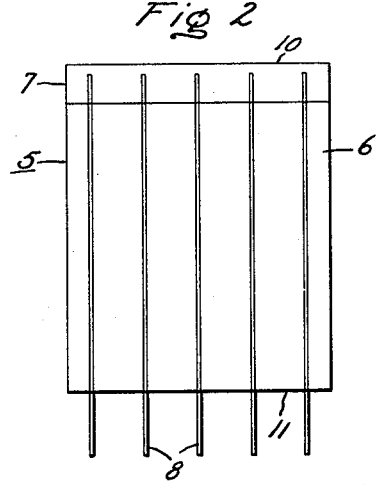
FIGURE 2 is a front phantom view of the electrode structure of FIGURE 1.

In FIGURES 1 and 2 there is shown an electrode structure 5 which comprises a body 6 of alumina having a layer 7 of zirconia bonded thereto. A plurality of spaced niobium conductors 8 are embedded in the body 6 of alumina and extend partially through layer 7 of zirconia, conductors 8 being substantially perpendicular to the exterior surface 10 of layer 7. The opposite ends of conductors 8 extend beyond the surface 11 of body 6 where they may be joined for connection to an appropriate lead.

When electrode 5 is employed as a component in an MHD generator, the moving conductive fluid contacts the surface 10 of zirconia layer 7. Both zirconia and alumina are high temperature, oxidation resistant, refractory oxides and both are highly resistant to erosion and corrosion effects caused by the high temperature moving conductive fluid and the seeding agents contained therein. The spacing of the ends of niobium conductors 8 beneath the surface 10 of zirconia layer 7 aids in protecting the niobium conductors from oxidation caused by the high temperature conductive fluid. However, the niobium conductors 8 may still be vulnerable to oxidation due to diffusion of oxygen through the hot surface 10.

To avoid oxidation by this diffused oxygen, the inherent oxidation resistance of the niobium conductors may be increased by alloying with significant amounts of molybdenum, tungsten, titanium, vanadium, or aluminum. Representative niobium alloys having increased oxidation resistance which may be used to form conductors 8 are types Cb–16 and Cb–7 developed by Union Carbide Metals Company. The former contains 20% tungsten, 10% titanium, 3% vanadium, and the balance niobium. The latter contains 28% tungsten, 7% titanium, and the balance niobium. Another acceptable alloy, developed by E. I. Dupont de Nemours Company and designated D–31, contains 10% molybdenum, 10% titanium, and the balance niobium. The oxidation resistance of the niobium or niobium alloy conductors 8 may also be increased by coating the conductors with an oxidation resistant coating; e.g., an alloy consisting of 10% chromium, 2% silicon, and the balance aluminum.

In operation, conduction between the flowing conductive fluid in contact with surface 10 and niobium conductors 8 is provided by the high temperature conductive characteristics of zirconia; i.e., that part of zirconia layer 7 near surface 10 which is maintained at temperatures exceeding about 1900° K. because of heat transfer from the conductive fluid has good electrical conductivity. Thus, the electrical currents generated through the interaction of the magnetic field and the moving conductive fluid are conducted to an external load through niobium conductors 8 and a portion of zirconia layer 7. The thickness of zirconia layer 7 is selected so that the interface between layer 7 and alumina body 6 does not reach a temperature range, due to heat transfer from the moving conductive fluid, sufficient to cause appreciable chemical reaction between the two materials.

A function of the electrode material in contact with the moving conductive fluid is the emission of electrons at the operating temperature of the generator. The low thermionic "work function" of zirconia renders it an efficient emitter of electrons at the elevated operating temperature of the MHD generator. Ten to twenty percent praseodymium oxide may be added to the zirconia to effect stabilization and improve the electrical conductivity and electron emission of the zirconia. Stabilization of the zirconia with five to ten percent calcium oxide improves the thermal shock resistance of zirconia layer 7.

The coefficients of thermal expansion of niobium and alumina are approximately the same so that mechanical stresses are not created in alumina body 6 upon an increase in temperature of electrode 5 due to heat transfer from the moving conductor fluid. Although the coefficients of thermal expansion of niobium and zirconia differ, the relatively short distances which the niobium conductors 8 extend into zirconia layer 7, as shown in FIGURE 2, minimize the stress problem in layer 7.

Improved mechanical strength of electrode 5 may be attained by utilizing a conductive network comprising grid-like wire screens 21, as shown in FIGURE 3(a), or thin metal sheets 22, having spaced perforations 23 therein, as shown in FIGURE 3(b), in place of niobium conductors 8. The screen or sheet may comprise niobium or a niobium alloy and may be coated with an oxidation resistant coating, as previously described. The portions of the screen or sheet extending longitudinally through electrode 5 and substantially perpendicular to surface 10 function, as conductors 8, to provide a path for the current generated in the MHD device. The transverse portions of the screen or sheet also serve to provide additional mechanical strength to electrode 5. The apertures in the screen and the perforations in the metal sheet provide continuity of the electrode material in which the screen or sheet is embedded, thereby increasing the mechanical strength of the electrode. Fabrication of electrode 5 may be facilitated by utilizing a dimpled wire screen or dimpled perforated metal sheet, the screen or sheet being rolled into a coil with the dimples maintaining uniform spacing between concentric portions. Alternatively, as shown in FIGURE 3(c), the conductive portion of the electrode may comprise a network formed of a stack of flat perforated sheets 25 alternated with corrugated sheets 26, mechanical interconnection being effected by spot welding at points 27 prior to embedding the structure in the electrode material.

FIGURES 4 and 5 illustrate a second embodiment of the invention where in the electrode 15 comprises a body 16 of zirconia with iridium conductors 17 embedded therein and extending normal to surface 18 which contacts the moving conductive fluid in the MHD device. As in the previous embodiment, the ends of conductors 17 are spaced below the surface 18, as shown most clearly in FIGURE 4, while the opposite ends of the conductors extend through surface 19 of zirconia body 16 for connection to an appropriate lead.

The zirconia body 16 is highly resistant to corrosion and erosion by the moving conductive fluid and the seeding agents contained therein which contact surface 18. The layer of zirconia body 16 overlying the ends of iridium conductors 17 adjacent surface 18 serves to protect the conductors 17 from oxidation. The iridium conductors 17 are inherently highly resistant to oxidation and are thus relatively unaffected by the oxygen which diffuses through the zirconia layer. In addition, this overlying layer of zirconia body 16 provides a conductive path between the moving conductive fluid and iridium conductors 17 due to the high temperature conductive characteristics of zirconia.

A satisfactory electrode of this type has been constructed in which a one-sixteenth inch spacing between the ends of iridium conductors 17 and surface 18 was found to be satisfactory in protecting iridium conductors 17 from oxidation and in providing conduction between the flowing conductive fluid and conductors 17. The iridium conductors utilized had a diameter of approximately thirty-five mils.

Zirconia body 16 may be stabilized with five to ten percent calcium oxide or ten to twenty percent praseodymium oxide to improve the characteristics of electrode 15. Stabilization with calcium oxide results in improved thermal shock resistance while stabilization with praseodymium oxide may be employed to improve the electrical conductivity and electron emission characteristics.

The coefficients of expansion of zirconia body 16 and iridium conductors 17 differ so that stress problems may arise if large cross-section conductors are used. However, it has been found that sufficient conductivity may be attained using small cross-section wire conductors and that the desirable feature of oxidation resistance in iridium outweighs the stress problem resulting from the use of iridium.

FIGURE 6 illustrates a conventional MHD arrangement described in the previously discussed copending application Serial No. 114,434 and shows an elongated rectangular fluid passage or duct 30 extending into the plane of the paper. Electrodes 15 are disposed in the duct so that the zirconia surfaces are exposed to the fluids and are connected to a load circuit which for simplicity of explanation and illustration is shown as a simple variable resistance 31. The duct is disposed between pole pieces 32, 33 of a suitable magnet. If the direction of an ionized gas flow is into the plane of the paper and a magnet field of constant flux density is applied at right angles to the direction of flow, as illustrated by the arrows labeled B, an EMF is generated in the conducting gas at right angles both to the field and to the direction of flow. This EMF acts on the free electrons in the ionized gas and causes an electron current to flow between the electrodes 15 and through the load 31 in the direction shown by the arrow I. If the direction of gas flow is reversed the current flow is in the opposite direction.

It will be apparent from the above description that novel electrodes have been disclosed which are particularly adapted for use in an MHD device. It is not intended to limit the invention to the embodiments shown, since it will be obvious to those skilled in the art that modifications of the present teaching may be made without department from the true spirit and scope of the invention. It is intended to limit the invention, therefore, only to the scope of the following claims.

What is claimed as new and desired to be secured by Letters Patent of the United States is:

1. An electrode for a magnetohydrodynamic device of the type in which the electrode is exposed to high temperature corrosive fluids comprising:
   (a) a body of refractory oxide selected from the group consisting of alumina and zirconia and including a layer of zirconia on one surface to be exposed to such fluids, and
   (b) at least one conductor embedded in said body and extending partially through said layer of zirconia.

2. The electrode of claim 1 in which said body of refractory oxide comprises alumina.

3. The electrode of claim 1 in which said body of refractory oxide comprises zirconia.

4. The electrode of claim 1 in which said conductor comprises niobium.

5. The electrode of claim 1 in which said conductor comprises iridium.

6. The electrode of claim 1 in which said conductor comprises niobium alloyed with metals selected from the group consisting of molybdenum, tungsten, titanium, vanadium, and aluminum.

7. An electrode for a magnetohydrodynamic device comprising:
   (a) a body of alumina,
   (b) a layer of zirconia overlying a surface of said body, and
   (c) a plurality of niobium conductors embedded in said body and extending partially through said layer of zirconia.

8. The electrode of claim 7 in which said layer of zirconia is stabilized with five to ten percent calcium oxide.

9. The electrode of claim 7 in which said layer of zirconia is stabilized with ten to twenty percent praseodymium oxide.

10. The electrode of claim 7 in which said niobium conductors include metals selected from the group consisting of molybdenum, tungsten, titanium, vanadium, and aluminum.

11. The electrode of claim 7 in which said niobium conductors are coated with an oxidation resistant coating.

12. An electrode for a magnetohydrodynamic device comprising:
   (a) a body of alumina,
   (b) a layer of zirconia overlying a surface of said body, and
   (c) a conductive network comprising niobium embedded in said body and having portions thereof extending partially through said layer.

13. An electrode for a magnetohydrodynamic device utilizing a flowing conductive fluid comprising:
   (a) a body of zirconia having a surface thereof adapted to contact the flowing conductive fluid, and
   (b) a plurality of iridium conductors embedded in said body and extending substantially normal to said surface, each conductor having one end thereof spaced below said surface.

14. The electrode of claim 13 in which said zirconia body is stabilized with five to ten percent calcium oxide.

15. The electrode of claim 13 in which said zirconia body is stabilized with ten to twenty percent praseodymium oxide.

References Cited by the Examiner
UNITED STATES PATENTS

| 2,006,081 | 6/35 | Anderson | 313—346 |
| 2,888,592 | 5/59 | Lafferty | 313—346 |
| 3,061,756 | 10/62 | Henderson | 313—311 X |

MILTON O. HIRSHFIELD, *Primary Examiner.*

DAVID X. SLINEY, *Examiner.*